US012292764B2

(12) United States Patent
An et al.

(10) Patent No.: US 12,292,764 B2
(45) Date of Patent: May 6, 2025

(54) DISPLAY ASSEMBLY AND DISPLAY DEVICE

(71) Applicant: BOE Technology Group Co., Ltd., Beijing (CN)

(72) Inventors: Che An, Beijing (CN); Jinxiang Xue, Beijing (CN); Jingkai Ni, Beijing (CN); Zhongyuan Sun, Beijing (CN); Yichi Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 211 days.

(21) Appl. No.: 17/914,494

(22) PCT Filed: Sep. 7, 2021

(86) PCT No.: PCT/CN2021/116810
§ 371 (c)(1),
(2) Date: Sep. 26, 2022

(87) PCT Pub. No.: WO2022/089004
PCT Pub. Date: May 5, 2022

(65) Prior Publication Data
US 2023/0129444 A1    Apr. 27, 2023

(30) Foreign Application Priority Data
Oct. 26, 2020    (CN) .......................... 202011155997.X

(51) Int. Cl.
G06F 1/16    (2006.01)
G09F 9/30    (2006.01)
(52) U.S. Cl.
CPC ............ G06F 1/1652 (2013.01); G09F 9/301 (2013.01)

(58) Field of Classification Search
CPC .............. G02F 1/1333; B32B 2307/51; B32B 2307/536; B32B 2307/54; B32B 2307/558; G06F 1/1652; G02B 1/14; G09F 9/301
See application file for complete search history.

(56) References Cited

U.S. PATENT DOCUMENTS 11,024,828 B2    6/2021    Kim et al.
11,081,660 B2    8/2021    Lee et al.
(Continued)

FOREIGN PATENT DOCUMENTS

CN    107464887 A    12/2017
CN    108806515 A    11/2018
(Continued)

OTHER PUBLICATIONS

De Guzman, Apr. 1994, "Mechanical Properties and Adhesion Measurements of Films used in Advanced Packages", IEEE, pp. 108-113. (Year: 1994).*
(Continued)

Primary Examiner — Sagar Shrestha
Assistant Examiner — Peter Krim
(74) Attorney, Agent, or Firm — XSENSUS LLP

(57) ABSTRACT

Provided are a display assembly and a display device. The display assembly includes a flexible display panel comprising a stretchable display area, a breakable area and a bonding area connected in sequence; a first support film on a side of the stretchable display area; and a second support film on a side of the bonding area, the second support film and the first support film being on a same side of the flexible display panel. An elongation of the first support film is greater than an elongation of the second support film, and a hardness of the first support film is less than a hardness of the second support film.

18 Claims, 4 Drawing Sheets

(56) References Cited

U.S. PATENT DOCUMENTS

| | | | |
|---|---|---|---|
| 11,665,955 B2* | 5/2023 | Park | H10K 59/873 257/40 |
| 2015/0147532 A1* | 5/2015 | Nam | H10K 59/871 428/172 |
| 2017/0352834 A1 | 12/2017 | Kim et al. | |
| 2019/0245157 A1* | 8/2019 | Chung | H01L 21/02098 |
| 2019/0341566 A1 | 11/2019 | Lee et al. | |
| 2020/0004077 A1* | 1/2020 | Lee | G02F 1/133305 |
| 2020/0013987 A1* | 1/2020 | Lee | H10K 59/1201 |
| 2020/0075872 A1 | 3/2020 | Gu et al. | |
| 2020/0266380 A1 | 8/2020 | Shi et al. | |
| 2021/0125527 A1* | 4/2021 | Ni | G09F 9/301 |
| 2021/0280828 A1 | 9/2021 | Kim et al. | |
| 2021/0370645 A1* | 12/2021 | Gu | B32B 27/08 |
| 2022/0006043 A1* | 1/2022 | E | B32B 3/16 |

FOREIGN PATENT DOCUMENTS

| | | | | |
|---|---|---|---|---|
| CN | 110429108 | A | | 11/2019 |
| CN | 110444678 | A | | 11/2019 |
| CN | 110660322 | A | | 1/2020 |
| CN | 111292621 | A | | 6/2020 |
| CN | 111489654 | A | | 8/2020 |
| CN | 111554729 | A | | 8/2020 |
| CN | 111968521 | A | * | 11/2020 ............ G09F 9/301 |
| CN | 212010975 | A | | 11/2020 |
| CN | 112185261 | A | | 1/2021 |
| EP | 3255482 | A1 | | 12/2017 |
| EP | 3564781 | A1 | | 11/2019 |
| EP | 3588601 | A2 | | 1/2020 |
| EP | 3588601 | A3 | | 3/2020 |
| EP | 3255482 | B1 | | 8/2021 |
| JP | 2011-164508 | A | | 8/2011 |
| JP | 5451443 | B2 | | 3/2014 |
| WO | 2021/169581 | A1 | | 9/2021 |

OTHER PUBLICATIONS

International Search Report and Written Opinion mailed on Nov. 29, 2021, in corresponding PCT/CN2021/116810, 7 pages.

Office Action issued on Dec. 27, 2021, in corresponding Chinese patent Application No. 202011155997.X, 17 pages.

Office Action issued on Jun. 24, 2022, in corresponding Chinese patent Application No. 202011155997.X, 14 pages.

Office Action issued on Sep. 28, 2022, in corresponding Chinese patent Application No. 202011155997.X, 15 pages.

Dongping Zhu, "Fundamentals of Materials Science Oral Revision Process Technology", China Traditional Chinese Medicine Press, Apr. 30, 2014, pp. 12-14 with English translation, total 9 pages.

Xuemeng Song, "Analysis of physical properties of metals", Aug. 31, 1981, pp. 91-94 with English translation, total 9 pages.

* cited by examiner

--Prior Art--

DISPLAY ASSEMBLY AND DISPLAY DEVICE

CROSS-REFERENCE TO RELATED APPLICATION

The present disclosure is a national phase entry under 35 U.S.C. § 371 of International Application No. PCT/CN2021/116810, filed on Sep. 7, 2021 and claims the priority to Chinese Patent Application No. 202011155997. X filed on Oct. 26, 2020, and entitled "DISPLAY ASSEMBLY AND DISPLAY DEVICE," the entire contents of which are incorporated herein by reference in their entireties.

TECHNICAL FIELD

The present disclosure relates to the field of display technologies, and in particular, to a display assembly and a display device including the display assembly.

BACKGROUND

In recent years, flexible OrganicElectroluminescence Display (OLED) display devices have attracted the attention of many users, of which stretching display is an essential component of flexible OLED.

At present, the stretchable display area of most of the flexible display panels include: an island area (display unit area), a bridge area (connecting unit area) and a hollow area. The adjacent island areas are connected by the bridge area to achieve a certain stretching performance by stretching the hollow area. Referring to FIG. 1, the flexible display panel 3 also includes a breakable area B connected to the stretchable display area A, and a bonding area C connected to the breakable area B. An elastic backing film 2 is attached to the back of the flexible display panel 3 for supporting and protecting the hollow device. However, when the flexible display panel 3 is equipped with an Integrated Circuit (IC) chip 1, a bonding process is necessary, which requires high precision. If the process is carried out on the flexible display panel 3 supported by the elastic backing film 2, due to the deformation of the elastic backing film 2 and the flexible display panel 3 caused by force when the bonding starts, bonding contacts 11 of IC chip 1 and connection contacts 31 of bonding area C are easily misaligned and the bonding fails, and finally the IC chip 1 cannot control the flexible display panel 3 correctly.

It should be noted that the above information disclosed in the "BACKGROUND" section is intended only to enhance the understanding of the context of this disclosure and may therefore include information that does not constitute prior art known to those of ordinary skill in the art.

SUMMARY

The purpose of the present disclosure is to provide a display assembly and a display device including the display assembly, thereby overcoming, at least to a certain extent, one or more problems caused by limitations and disadvantages of the related art.

According to an aspect of the present disclosure, there is provided a display assembly, including: a flexible display panel including a stretchable display area, a breakable area and a bonding area connected in sequence; a first support film on a side of the stretchable display area; and a second support film on a side of the bonding area, the second support film and the first support film being on a same side of the flexible display panel; where an elongation of the first support film is greater than an elongation of the second support film, and a hardness of the first support film is less than a hardness of the second support film.

According to an aspect of the present disclosure, there is provided a display device, including the display assembly as described above.

Other features and advantages of the present disclosure will become apparent through the following detailed description, or will be learned in part through the practice of the present disclosure.

It should be understood that the foregoing general description and the following detailed description are only exemplary and explanatory, and do not limit the present disclosure.

BRIEF DESCRIPTION OF THE DRAWINGS

Accompanying drawings herein, which are incorporated in the specification and form a part of the specification, show embodiments conforming to the present disclosure, and are used to explain the principles of the present disclosure together with the specification. Obviously, the accompanying drawings in the following description are only some embodiments of the present disclosure, and other accompanying drawings may be obtained according to these accompanying drawings without any creative efforts by those of ordinary skill in the art.

DETAILED DESCRIPTION

Figure 1:
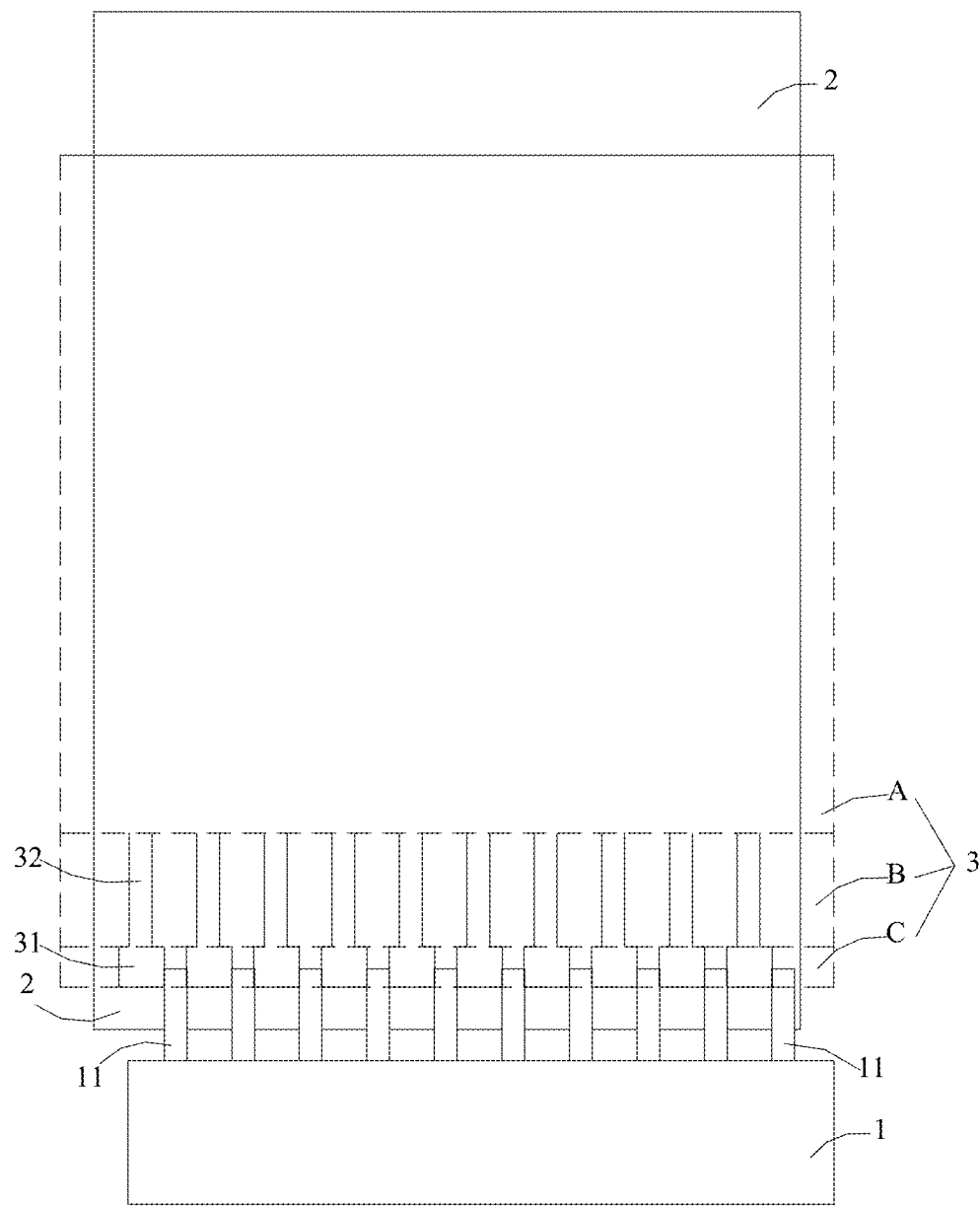
FIG. 1 is a structural schematic diagram of the misalignment of bonding contacts after bonding of a display assembly in the prior art.

Exemplary embodiments will now be described more fully with reference to the accompanying drawings. However, the exemplary embodiments can be implemented in a variety of forms, and should not be construed as limited to the embodiments described herein. On the contrary, by providing these embodiments, the present disclosure will be comprehensive and complete, and the conception of the exemplary embodiments will be fully communicated to those skilled in the art. The same reference numeral in the figures represents the same or similar structure, and therefore their detailed description will be omitted.

According to some exemplary embodiments of the present disclosure, a display assembly is first provided. Referring to structural schematic diagrams of a display assembly according to a plurality of exemplary embodiments of the present disclosure shown in FIGS. 2 to 7, the display assembly may include a flexible display panel 3, a first support film 4, and a second support film 5. The flexible display panel 3 includes a stretchable display area A, a breakable area B, and a bonding area C connected in sequence. The first support film 4 is provided on one side of the stretchable display area A. The second support film 5 is provided on one side of the bonding area C. The second support film 5 is located on the same side of the flexible display panel 3 as the first support film 4. An elongation of the first support film 4 is greater than an elongation of the second support film 5, and a hardness of the first support film 4 is less than a hardness of the second support film 5.

In some exemplary embodiments of the present disclosure, the stretchable display area A of the flexible display panel 3 may include: an island area (display unit area), a bridge area (connecting unit area), and a hollow area, none of which is shown in the figures, adjacent island areas being connected by a bridge area. The island area is provided with light-emitting units, and the light-emitting units include organic light-emitting graphics. The breakable area B is connected between the stretchable display area A and the bonding area C, with a concentration of metal wires 32 connecting the stretchable display area A and the bonding area C. Therefore, breakage is very likely to occur in the breakable area B. A plurality of connection contacts 31 are provided in the bonding area C for bonding with the bonding contacts 11 of the IC chip 1 to connect the IC chip 1 to the flexible display panel 3.

In some exemplary embodiments of the present disclosure, the elongation of the first support film 4 is greater than the elongation of the second support film 5. For example, the elongation of the first support film 4 is greater than or equal to 20% and less than or equal to 40%, and the elongation of the second support film 5 is less than or equal to 3%. Elongation is an index describing the plastic properties of a material, and the elongation is the percentage of the total deformation of a gauge length section to the original gauge length after stretching and breakage of the sample.

In some exemplary embodiments of the present disclosure, the hardness of the first support film 4 is less than the hardness of the second support film 5. For example, the hardness of the first support film 4 is greater than or equal to 1 MPa and less than or equal to 10 Mpa, and the hardness of the second support film 5 is greater than or equal to 1 GPa and less than or equal to 10 Gpa.

Since the material properties of the first support film 4 and the second support film 5 differ greatly, they cannot be made into a one-piece film. The first support film 4 is provided on one side of the stretchable display area A, and the second support film 5 is provided on one side of the bonding area C. The first support film 4 is provided a first portion 41 and a second portion, where the first portion 41 is closer to the second support film 5 than the second portion of the first support film. The second support film 5 is provided a first portion 51 and a second portion, where the first portion 51 is closer to the first support film 4 than the second portion of the second support film 5. The first portion 41 and the first portion 51 can be lapped to each other, and the width of the lap between the second support film 5 and the first support film 4 is greater than or equal to 1 mm and less than or equal to 2 mm. The second portion of the first support film 4 may protrude from the stretchable display area A, and the second portion of the second support film 5 may protrude from the bonding area C. The first support film 4 have two ends that may protrude from the stretchable display area A or have two ends that may be flush with the stretchable display area A, and the second support film 5 have two ends that may protrude from the bonding area C or have two ends that may be flush with the bonding area C. Specific embodiments of the first support film 4 lapped to the second support film 5 are as follows.

Figure 2:
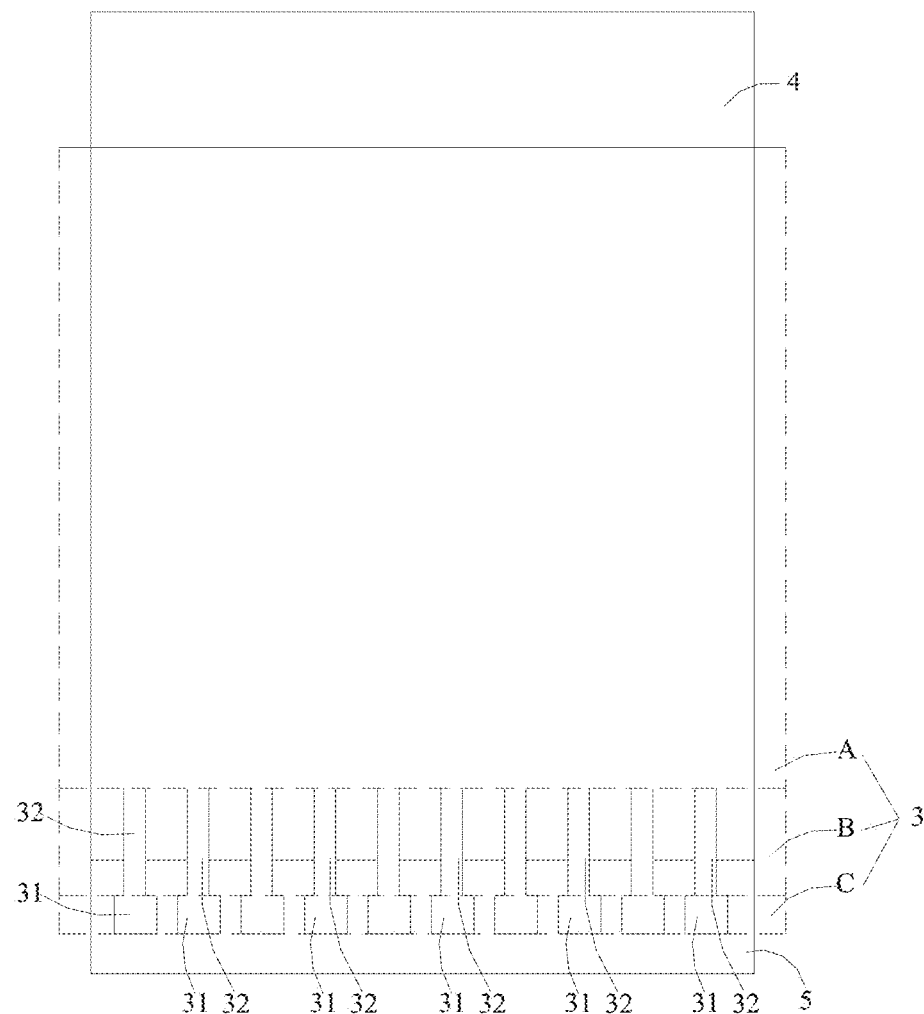
FIG. 2 is a structural schematic diagram of a display assembly according to a first exemplary embodiment of the present disclosure.
Figure 3:
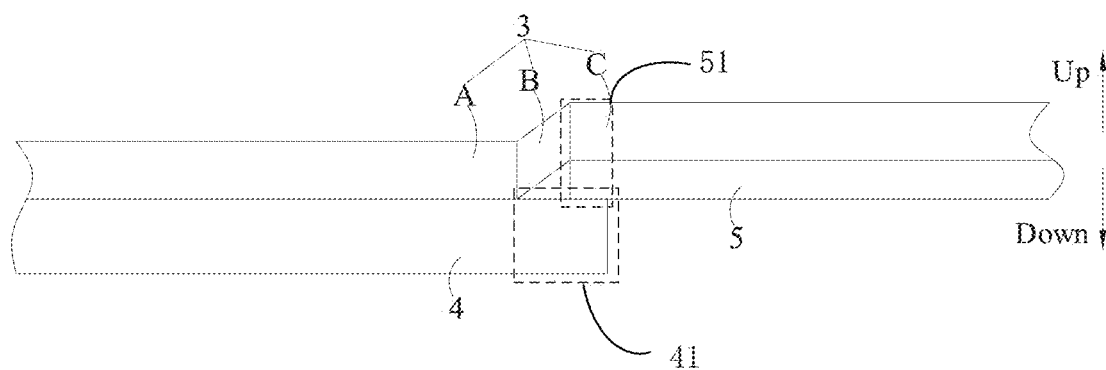
FIG. 3 is a structural schematic diagram of a left side view of FIG. 2.

Referring to the structural schematic diagrams of the display assembly according to a first exemplary embodiment of the present disclosure shown in FIGS. 2 and 3, the first portion 51, close to the first support film 4, of the second support film 5 is located between the flexible display panel 3 and the first support film 4. This first portion 51 of the second support film 5 can be bonded to the first support film 4, and then the flexible display panel 3 can be attached to the first support film 4 and the second support film 5. Besides, the second support film 5 is located below the bonding area C, and the first support film 4 is located below the stretchable display area A. Since the first support film 4 and the second support film 5 are lapped to each other, the first support film 4 extends to the breakable area B and below the first portion 51 of the second support film 5 close to the first support film 4, so that the first portion 51 of the second support film 5 close to the first support film 4 is located between the flexible display panel 3 and the first support film 4. Due to the lap of the first support film 4 and the second support film 5, the upper surface of the first support film 4 and the upper surface of the second support film 5 are not in a plane with height difference, so that the breakable area B forms an inclined shape. In order to reduce the possibility of breakage in the breakable area B, a smaller height difference is required, i.e., the thickness of the second support film 5 is as small as possible while ensuring the hardness required by the bonding process. For example, the thickness of the second support film 5 is greater than or equal to 50 μm and less than or equal to 500 μm.

Figure 4:
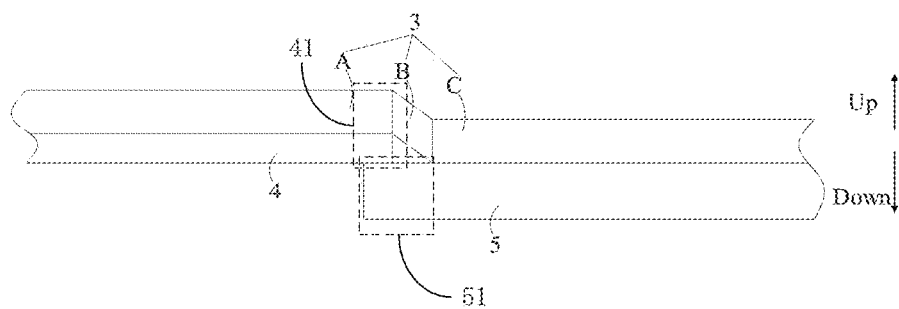
FIG. 4 is a structural schematic diagram of a display assembly according to a second exemplary embodiment of the present disclosure.

Referring to the structural schematic diagram of the display assembly according to a second exemplary embodiment of the present disclosure shown in FIG. 4, the first portion 41, close to the second support film 5, of the first support film 4 is located between the flexible display panel 3 and the second support film 5. This first portion 41 of the first support film 4 can be bonded to the second support film 5, and then the flexible display panel 3 can be attached to the first support film 4 and the second support film 5. Besides, the second support film 5 is located below the bonding area C, and the first support film 4 is located below the stretchable display area A. Since the first support film 4 and the second support film 5 are lapped to each other, the second support film 5 extends to the breakable area B and below the first portion 41 of the first support film 4 close to the second support film 5, so that the first portion 41 of the first support film 4 close to the second support film 5 is located between the flexible display panel 3 and the second support film 5. Due to the lap of the first support film 4 and the second support film 5, the upper surface of the first support film 4 and the upper surface of the second support film 5 are not in a plane with height difference, so that the breakable area B forms an inclined shape. In order to reduce the possibility of breakage in the breakable area B, a smaller height difference is required, i.e., the thickness of the first support film 4 is as small as possible while ensuring the stretching and supporting effect. For example, the thickness of the first support film 4 is greater than or equal to 100 μm and less than or equal to 500 μm.

Alternatively, the first portion 41, close to the second support film 5, of the first support film 4, and the first portion 51, close to the first support film 4, of the second support film 5 may not be lapped with each other. The second portion of the first support film 4 may protrude from the stretchable display area A, and the second portion of the second support film 5 may protrude from the bonding area C. The first support film 4 have two ends that may protrude from the stretchable display area A, or have two ends that may be flush with the stretchable display area A. The second support film 5 have two ends that may protrude from the bonding area C or have two ends that may be flush with the bonding area C. Specific exemplary embodiments are as follows.

Referring to the structural schematic diagram of the display assembly according to a third exemplary embodiment of the present disclosure shown in FIG. 5, the second support film 5 is located below the bonding area C, and the first portion 51 of the second support film 5 close to the first support film 4 extends below the breakable area B; and the first support film 4 is located below the stretchable display area A, and the first portion 41 of the first support film 4 close to the second support film 5 extends below the breakable area B. The second support film 5 and the first support film 4 are provided with a gap 6, that is, the first support film 4 and the second support film 5 are not lapped, and an orthographic projection of the gap 6 on the flexible display panel 3 is located within the breakable area B, so that the breakable area B is partially in a suspended state. In this case, the width of the gap 6 is less than 2 mm.

Figure 5:
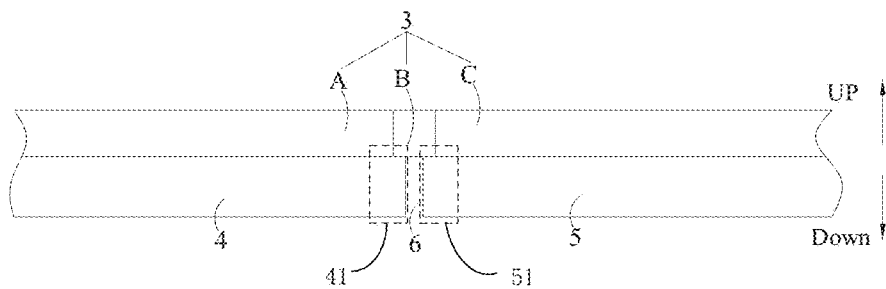
FIG. 5 is a structural schematic diagram of a display assembly according to a third exemplary embodiment of the present disclosure.

Referring to the structural schematic diagram of the display assembly according to a fourth exemplary embodiment of the present disclosure shown in FIG. 6, the main difference between this exemplary embodiment and the exemplary embodiment shown in FIG. 5 is that: the second support film 5 is only located below the bonding area C and does not extend below the breakable area B; and the first support film 4 is only located below the stretchable display area A and does not extend below the breakable area B. That is, the orthographic projection of the gap 6 on the flexible display panel 3 overlaps with the breakable area B. In this case, the width of the gap 6 is relatively wide and the same as the width of the breakable area B, about 2 mm, so that the breakable area B is suspended in the air.

Of course, in other exemplary embodiments of the present disclosure, it may be that the first portion 41 of the first support film 4 close to the second support film 5 extends to the breakable area B, but that the second support film 5 does not extend below the breakable area B. Alternatively, it can also be that the first support film 4 does not extend below the breakable area B, but that the first portion 51 of the second support film 5 close to the first support film 4 extends below the breakable area B. In these cases, the width of the gap 6 is less than 2 mm.

Referring to the structural schematic diagram of the display assembly according to a fifth exemplary embodiment of the present disclosure shown in FIG. 7, the main difference between this exemplary embodiment and the exemplary embodiment shown in FIG. 5 is that: the second support film 5 is located below the bonding area C, and the first portion 51 of the second support film 5 close to the first support film 4 extends below the breakable area B; the first support film 4 is located below the stretchable display area A, and the first portion 41 of the first support film 4 close to the second support film 5 extends below the breakable area B; and an end face, close to the first support film 4, of the second support film S is in contact with an end face, close to the second support film 5, of the first support film 4, an orthographic projection of the contact on the flexible display panel 3 being within the breakable area B. In other exemplary embodiments of the present disclosure, the end face of the second support film 5 close to the first support film 4 and the end face of the first support film 4 close to the second support film 5 may be bonded together by adhesive, which also provides support to the breakable area B so that there is not easy to have breakage occur in the breakable area B.

Further, in other exemplary embodiments of the present disclosure, it may be that the first portion 41 of the first support film 4 close to the second support film 5 extends to the breakable area B until it contacts the second support film 5, but that the second support film 5 does not extend below the breakable area B. Alternatively, it may also be that the first support film 4 does not extend below the breakable area B, but that the first portion 51 of the second support film 5 close to the first support film 4 extends below the breakable area B until it is in contact with the first support film 4.

Figure 6:
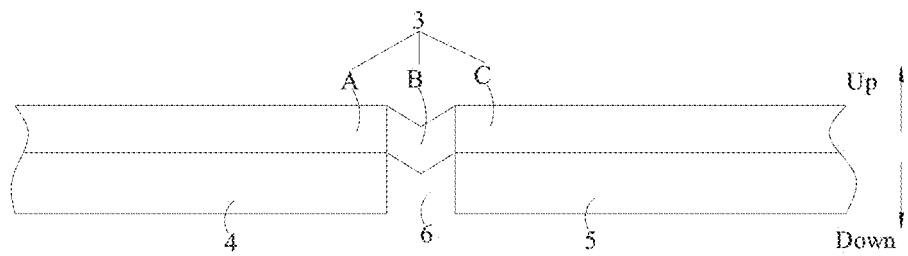
FIG. 6 is a structural schematic diagram of a display assembly according to a fourth exemplary embodiment of the present disclosure.
Figure 7:
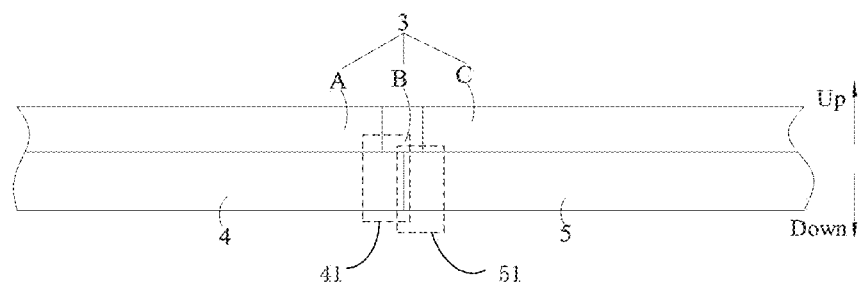
FIG. 7 is a structural schematic diagram of a display assembly according to a fifth exemplary embodiment of the present disclosure.

It should be noted that in the exemplary embodiments shown in FIGS. 5, 6 and 7, the thickness of the first support film 4 may be the same as the thickness of the second support film 5 to provide a flatter support surface for the flexible display panel 3 so that there is not easy to have breakage occur in the breakable area B. The second support film 5 may be structured with multiple layers of film to maintain the same thickness as the first support film 4. Alternatively, the first support film 4 may also be structured with multiple layers of film to maintain the same thickness as the second support film 5.

Figure 8:
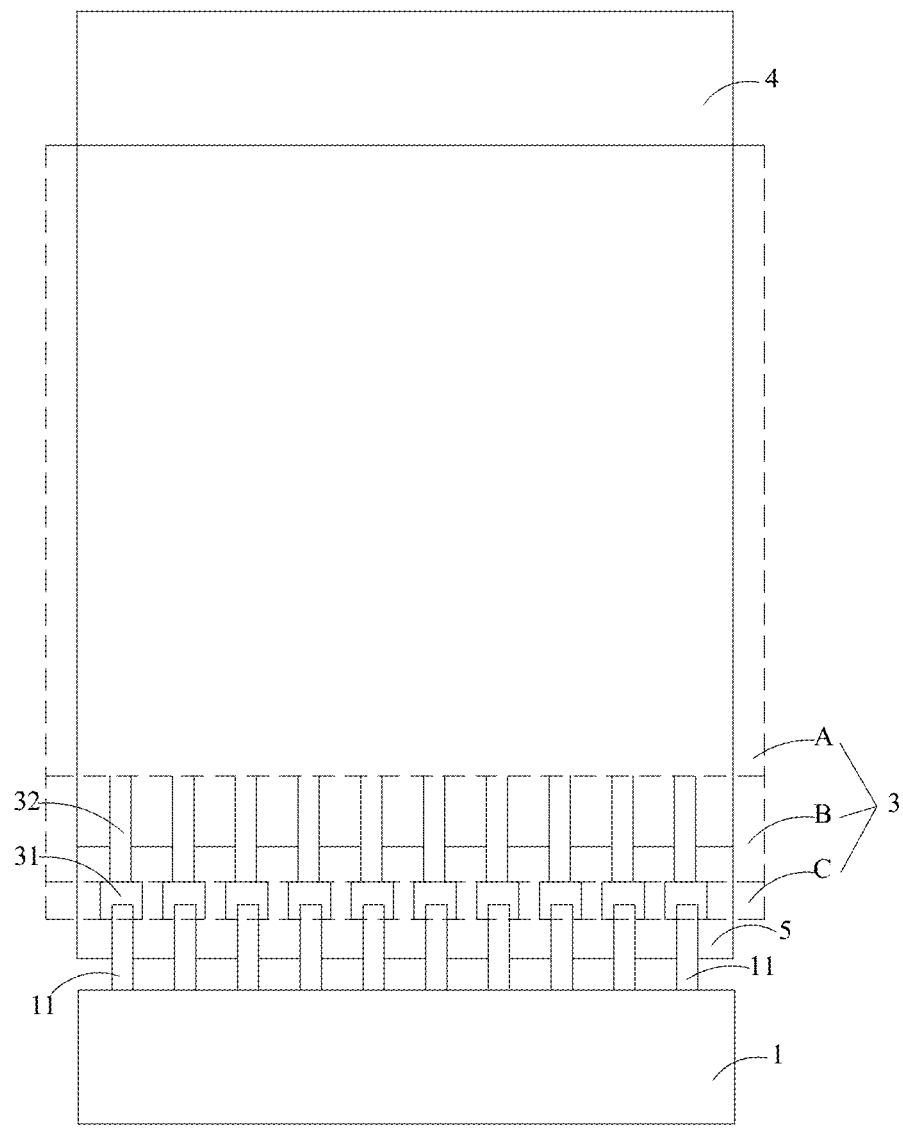
FIG. 8 is a schematic diagram of a structure of the display assembly of the present disclosure after bonding to the IC chip.

Referring to a schematic diagram of a structure of the display assembly of the present disclosure after bonding to the IC chip shown in FIG. 8, the support films of the bonding area C and the stretchable display area A are set separately so that the first support film 4 of the stretchable display area A meets the stretching requirements, and the first support film 4 has sufficient elongation to ensure the stretching amount of the stretchable display area A when stretching, and so that the second support film 5 of the bonding area C meets the bonding requirements, and the second support film 5 has enough hardness to support the bonding area C of the flexible display panel 3 to prevent it from easily deforming when bonding. In this way, it is not easy to cause the bonding contacts 11 to be misaligned with the connection contacts 31 of the bonding area C resulting in the failure of bonding, and will not make the IC chip 1 unable to control the flexible display panel 3 correctly.

Moreover, developing a new bonding process may be time-consuming, costly and less feasible. However, this problem can be effectively solved by using the first support film and the second support film of the present disclosure without affecting the stretching effect, and also allows the use of the original process for bonding with low cost and high feasibility.

Further, the present disclosure provides a display device which may include the display assembly as described in any one of the above embodiments. The specific structure of the display assembly has been described in detail above, so it will not be repeated here.

The specific type of the display device is not particularly limited, which can be any types of display devices commonly used in the field, for example, cell phones and other mobile devices, watches and other wearable devices, VR devices, etc., and can be selected by a person skilled in the field accordingly according to the specific use of the display device, and will not be repeated here.

It should be noted that the display device, in addition to the display assembly, also includes other necessary parts and components. Taking a display as an example, it may specifically include, housing, circuit boards, power lines, and so on, which can be added accordingly by the person skilled in the field according to the specific requirements of the use of the display device, and will not be repeated here.

Compared with the prior art, the beneficial effects of the display device according to the exemplary embodiments of the present disclosure are the same as the beneficial effects of the display assembly according to the exemplary embodiments above and will not be repeated here.

The features, structures or characteristics described above may be combined in any suitable manner in one or more embodiments and, if possible, the features discussed in the various embodiments are interchangeable. In the above description, many specific details are provided thereby giving a full understanding of the embodiments of the present disclosure. However, those skilled in the art will realize that it is possible to practice the technical embodiments of the present disclosure without one or more of the specific details described, or that other methods, components, materials, etc. may be employed. In other instances, well-known structures, materials, or operations are not shown or described in detail to avoid obscuring aspects of the present invention.

The terms "about" and "approximately" as used in this specification generally indicate that they are within 20%, preferably within 10%, and more preferably within 5% of a given value or range. The quantities given herein are approximate quantities, meaning that "about," "approximately," "roughly," "probably" may still be implied in the absence of a specific specification.

Although relative terms such as "up" and "down" are used in this specification to describe the relative relationship of one component of the icon to another, these terms are used in this specification only for convenience, for example, according to the orientation of the examples illustrated in the accompanying drawings. It should be understood that if the device of the icon is flipped so that it is upside down, the component described as being "up" will become the component described as being "down". Other relative terms such as "high", "low", "top", "bottom", etc. have similar meanings. When a structure is "on" other structures, it may mean that the structure is integrally formed on other structures, or that the structure is "directly" set on other structures, or that the structure is "indirectly" set on other structures through another structure.

In this specification, the terms "one", "a/an", "the" and "said" are used to indicate the presence of one or more elements/components/etc. The terms "contains", "includes" and "has/have" are used to indicate an open-ended inclusion and refer to the existence of additional elements/components/etc. in addition to the listed elements/components/etc. The terms "first", "second" and "third" are used only as indications and not as limitations on the number of objects.

It should be understood that the present disclosure does not limit its application to the detailed construction and arrangement of the components presented in this specification. The present disclosure can have other embodiments and can be realized and performed in a variety of ways. The aforementioned variant and modified forms fall within the scope of the present disclosure. It should be understood that the present application as disclosed and limited by this specification extends to all alternative combinations of two or more individual features mentioned or apparent in the text and/or the accompanying drawings. All of these different combinations constitute multiple alternative aspects of the present application. The embodiments described in this specification illustrate the best manner known for implementing the present application and will enable those skilled in the art to utilize the application.

What is claimed is:

1. A display assembly, comprising:
   a flexible display panel comprising a stretchable display area, a breakable area and a bonding area connected in sequence;
   a first support film on a side of the stretchable display area; and
   a second support film on a side of the bonding area, the second support film and the first support film being on a same side of the flexible display panel;
   wherein an elongation of the first support film is greater than an elongation of the second support film, and a hardness of the first support film is less than a hardness of the second support film; and
   wherein the second support film comprises a first portion and a second portion, wherein the first portion of the second support film is closer to the first support film than the second portion of the second support film;
   the first support film comprises a first portion and a second portion, wherein the first portion is of the first support film is closer to the second support film than the second portion of the first support film; and
   the first portion of the first support film is overlapped with the first portion of the second support film in the breakable area, and an overlapping area between the second portion of the first support film and the second portion of the second support film is zero.

2. The display assembly according to claim 1, wherein the elongation of the first support film is greater than or equal to 20% and less than or equal to 40%, and the elongation of the second support film is less than or equal to 3%.

3. The display assembly according to claim 1, wherein the hardness of the first support film is greater than or equal to 1 MPa and less than or equal to 10 Mpa, and the hardness of the second support film is greater than or equal to 1 GPa and less than or equal to 10 Gpa.

4. The display assembly according to claim 1, wherein the first portion of the second support film is between the flexible display panel and the first support film.

5. The display assembly according to claim 4, wherein a thickness of the second support film is greater than or equal to 50 μm and less than or equal to 500 μm.

6. The display assembly according to claim 1, wherein the first portion of the first support film is between the flexible display panel and the second support film.

7. The display assembly according to claim 6, wherein a thickness of the first support film is greater than or equal to 100 μm and less than or equal to 500 μm.

8. The display assembly according to claim 1, wherein the first portion of the first support film is overlapped with the first portion of the second support film at a width greater than or equal to 1 mm and less than or equal to 2 mm.

9. The display assembly according to claim 1, wherein a gap is provided between the second support film and the first support film, an orthographic projection of the gap on the flexible display panel being within or overlapping with the breakable area.

10. The display assembly according to claim 1, wherein an end face, close to the first support film, of the second support film is in contact with an end face, close to the second support film, of the first support film, an orthographic projection of the contact on the flexible display panel being within the breakable area.

11. The display assembly according to claim 9, wherein a thickness of the second support film is equal to a thickness of the first support film.

12. A display device, comprising a display assembly, wherein the display assembly comprises:
a flexible display panel comprising a stretchable display area, a breakable area and a bonding area connected in sequence;
a first support film on a side of the stretchable display area; and
a second support film on a side of the bonding area, the second support film and the first support film being on a same side of the flexible display panel;
wherein an elongation of the first support film is greater than an elongation of the second support film, and a hardness of the first support film is less than a hardness of the second support film; and
wherein the second support film comprises a first portion and a second portion, wherein the first portion of the second support film is closer to the first support film than the second portion of the second support film;
the first support film comprises a first portion and a second portion, wherein the first portion is of the first support film is closer to the second support film than the second portion of the first support film; and
the first portion of the first support film is overlapped with the first portion of the second support film in the breakable area, and an overlapping area between the second portion of the first support film and the second portion of the second support film is zero.

13. The display device according to claim 12, wherein the first portion of the second support film is between the flexible display panel and the first support film.

14. The display device according to claim 12, wherein the first portion of the first support film is between the flexible display panel and the second support film.

15. The display device according to claim 12, wherein a gap is provided between the second support film and the first support film, an orthographic projection of the gap on the flexible display panel being within or overlapping with the breakable area.

16. The display device according to claim 12, wherein an end face, close to the first support film, of the second support film is in contact with an end face, close to the second support film, of the first support film, an orthographic projection of the contact on the flexible display panel being within the breakable area.

17. The display device according to claim 15, wherein a thickness of the second support film is equal to a thickness of the first support film.

18. The display assembly according to claim 10, wherein a thickness of the second support film is equal to a thickness of the first support film.

* * * * *